Dec. 19, 1967     R. C. MARTIN ET AL     3,358,377

LEVEL INDICATING DEVICE WITH AIR BEARING PENDULUM

Filed Oct. 4, 1965

Robert C. Martin
Fritz K. Mueller
Heinrich C. Rothe,
             INVENTORS.

BY

United States Patent Office 3,358,377
Patented Dec. 19, 1967

3,358,377
LEVEL INDICATING DEVICE WITH AIR BEARING PENDULUM
Robert C. Martin, Fritz K. Mueller, and Heinrich C. Rothe, Huntsville, Ala., assignors to the United States of America as represented by the Secretary of the Army
Filed Oct. 4, 1965, Ser. No. 492,951
1 Claim. (Cl. 33—206)

ABSTRACT OF THE DISCLOSURE

A level indicating device that has an air supported pendulum with a magnetic core at one end for movement relative to differential transformer coils to vary the flux distribution of the coils and thereby produce signals that are proportional to movement of the magnetic core away from a center position relative to the transformer coils.

---

The invention described herein may be manufactured and used by or for the Government for governmental purposes without the payment of any royalty thereon.

This invention relates to a level indicating device that may be used to indicate departures from the level, plumbline or other attitude of various movable objects. An example of such an object is a stabilized platform on an aircraft, guided missile, ship, or land vehicle, which platform constitutes a level support for a compass, a pitch detector, a roll detector, a camera, or other instrument.

In the missile industry, a constant need exists for leveling devices of this type that are simple, compact, accurate, reliable, and relatively cheap to build.

Therefore, it is an object of this invention to provide a simple leveling device that has a pendulum that is accurately supported by air bearing means.

Another object of this invention is to provide a leveling device that has electrical pickoff means at one end and air supported bearing and dampening means at the other end.

A further object of this invention is to provide a leveling device that is compact and therefore small in size and light in weight.

In accordance with this invention, a level indicating device is provided that has a housing in which a pendulum is air supported. The pendulum has vibration dampening means at one end and a movable iron core at the other end which acts as the movable core for differential transformer coils mounted in the housing. Signals from the differential transformer are used for indicating the deviation of the pendulum from a level position, and the signals may also be used to feed means to cause the device to be brought back to a level position.

In the accompanying drawing forming a part of this specification, and in which like numerals are employed to designated corresponding parts throughout the same:

Figure 1:
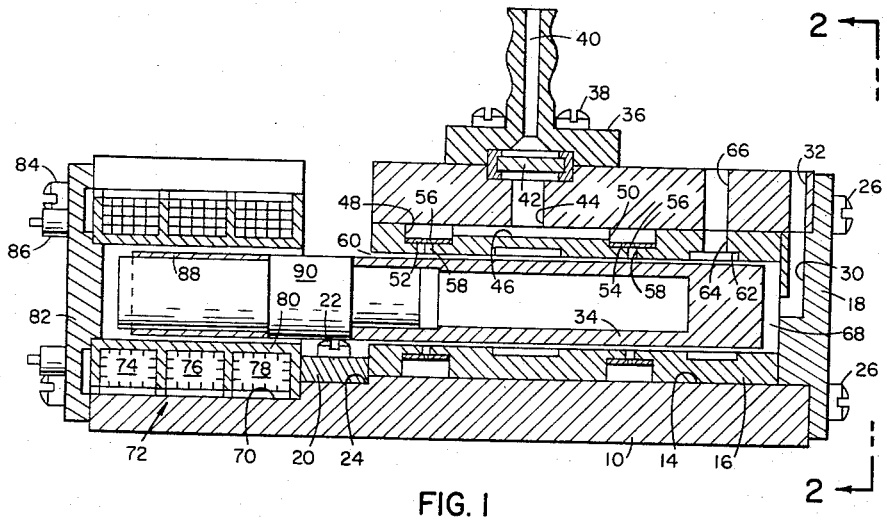
FIGURE 1 is a sectional view of a level indicating device according to this invention.
Figure 2:
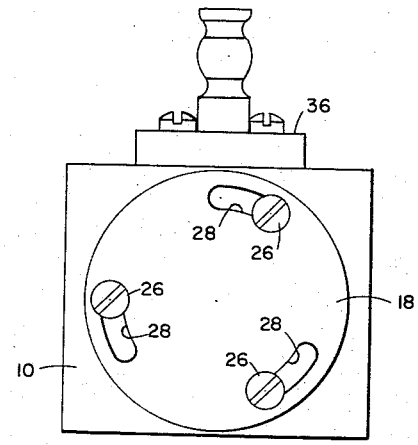
FIGURE 2 is an end view, along line 2—2 of FIG. 1.

Referring now to the drawing, the level indicating device includes a housing or casing 10 that has a stepped bore therethrough. Smaller diameter bore position 14 has apertured core sleeve 16 mounted therein by end cap 18 and member 20. Member 20 is secured in intermediate bore portion 24 by screws 22, and end cap 18 is secured to housing 10 by screws 26. Slots 28 in end cap 18 (see FIGURE 2) allow passage 30 (see FIGURE 1) of the end cap to be adjusted relative to passage 32 in housing 10. Piston 34 is slidably mounted in sleeve 16 with clearance space between the piston and sleeve for air bearing support of the piston. Housing 10 has inlet plug 36 secured thereto by screws 38, and passage 40 in inlet plug 36 communicates air from some conventional source through filter 42 to passage 44 in housing 10. Passage 44 communicates with one of a plurality of longitudinal slots 46 in sleeve 16. Slots 46 communicate the air to circumferential grooves 48, and 50. Foil pieces 52, 54 are cemented to the base of grooves 48 and 50, and foil pieces 52, 54 have pin holes 56 that are in coaxial alignment with larger ports 58 in sleeve 16. Air passing through holes 56 and ports 58 is communicated to the clearance space to cause piston 34 to float in the sleeve. Air from the clearance space is exhausted at end 60 of sleeve 16 to atmosphere and through circumferential groove 62 and passages 64, 66 to the atmosphere. Longitudinal movement of piston 34 is dampened by air in chamber 68 at one end of piston 34. Since the flow between passages 30, 32 is restricted due to the adjustment of the passages relative to each other, the air flow to or from chamber 68 is limited to thereby dampen movement of piston 34. Other adjusting means for restricting the flow to and from chamber 68 may be provided, if desired.

The housing also houses differential transformer 72 that has coils 74, 76, 78 mounted on bobbin 80. Bobbin 80 is received in large diameter bore portion 70, and end closure 82 secures bobbin 80 in the housing by being secured to the housing by screws 84. Electrical leads for the coils pass through end closure 82 and are insulated therefrom by insulations 86. Magnetic material core sleeve 88 of the differential transformer is mounted inside bobbin 80 on connector member 90 that is secured to the other end of piston 34. Connector member 90 is made of non-magnetic material.

Figure 3:
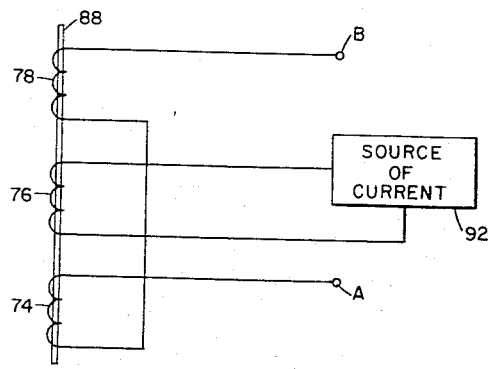
FIGURE 3 is an electrical wiring schematic.

With reference to the schematic showing of the differential transformer in FIGURE 3, a source 92, such as a 400 cycle source, is connected to the leads of middle coil 76. Outer coils 74, 78 are connected in series opposition, and voltages induced therein are conducted therefrom by terminals A and B to a level indicating device and/or to circuits of an automatic control system (not shown).

In operation, with the air bearing operating to cause piston 34 to float in sleeve 16 and with housing 10 positioned in a horizontal level position, core sleeve 88 will be centered in the differential transformer. In this centered position, equal and opposite voltages will be induced in end coils 74, 78, and a zero voltage will be noted across terminals A and B. If housing 10 is tilted from the horizontal level position, elongated pendulum member, defined by core sleeve 88, connector member 90 and piston 34, will be tilted along its longitudinal axis and thereby cause a force to be exerted along the longitudinal axis equal to $Mg \sin \alpha$, where M is the total mass of the movable pendulum, $g$ is the gravitational acceleration, and $\alpha$ is the angle of tilt. For a movable element $Mg=10$ grams, tilted at an angle of 0.01 degree, the force $F=10 \sin 0.01 = 0.00175$ gms.$=1.78$ dynes. This force causes the pendulum member to move in the direction of the force.

As core sleeve 88 moves away from the center position within differential transformer coils 74, 76, 78, the flux distribution is changed. This altered flux distribution results in a reaction force proportional to the movement of core sleeve 88 away from the center position, and in unequal voltages being induced in end coils 74, 78, the difference of which is proportional to the movement of core sleeve 88 away from the center position. This difference in voltages is used to actuate the indicating and/or control means desired.

It is to be understood that the form of our invention, herewith shown and described, is to be taken as a preferred example of the same, and that the scope thereof is to be measured by the breadth of the subjoined claim.

We claim:

A level indicating device including a housing, said housing having a bore therethrough; a sleeve mounted in said bore and toward one end of said housing; means securing said sleeve in said bore; a piston mounted in said sleeve with an air bearing clearance space therebetween; a closure cap secured to one end of said housing and defining with one end of said piston and sleeve a damping chamber; means defining a restricted passage communicating air to and from said chamber to dampen movement of said piston, said means defining said restricted passage including a passage in said cap communicating with a passage in said housing and said closure cap being adjustably secured to said housing by screws passing through arcuate slots in the closure cap to allow the closure cap to be rotated relative to the housing and adjust the passage therein relative to the housing passage in communication therewith; passage means in said housing and sleeve communicating air circumferentially of and at spaced positions along said piston to provide air to said air bearing space, said passage means in said housing and sleeve including a plurality of spaced circumferential grooves in said sleeve and ports in said sleeve that open into said air bearing space; means in said housing and sleeve for exhausting air from said air bearing space, said means for exhausting air including a cut out portion in said housing in communication with one end of said sleeve, and passages in said housing and sleeve adjacent the other end of said sleeve; differential transformer means including coils mounted in said bore and toward the other end of said housing and a movable core mounted in said coils and connected to said piston by a non-magnetic member; and an end closure secured to the other end of said housing and holding said coils in place inside said bore.

References Cited

UNITED STATES PATENTS

| | | | |
|---|---|---|---|
| 1,751,591 | 3/1930 | McCloskey | 251—208 |
| 1,879,587 | 9/1932 | Swain | 33—218 |
| 2,018,403 | 10/1935 | Hussar | 73—118 |
| 2,572,950 | 10/1951 | Rider | 251—208 |
| 2,958,137 | 11/1960 | Mueller | 33—206.5 |
| 2,926,530 | 3/1960 | Mueller | 33—206.5 X |
| 3,070,407 | 12/1962 | Hughes | 308—9 |

LEONARD FORMAN, *Primary Examiner.*

LLOYD V. ANDERSON, *Assistant Examiner.*